United States Patent [19]

Jones, Jr. et al.

[11] 3,946,616
[45] Mar. 30, 1976

[54] LIQUID CRYSTAL ACCELEROMETER

[75] Inventors: Freeman B. Jones, Jr., Westlake Village; Ronald M. Govan, Camarillo, both of Calif.

[73] Assignee: Rockwell International Corporation, El Segundo, Calif.

[22] Filed: Aug. 9, 1974

[21] Appl. No.: 496,429

[52] U.S. Cl. ........ 73/516 R; 350/150; 350/160 LC; 356/28; 356/256
[51] Int. Cl.² ..................... G01P 15/00; G02F 1/13
[58] Field of Search ............ 73/71.3, 516 R, 517 R; 350/150, 160 LC; 356/28, 256

[56] References Cited
UNITED STATES PATENTS

| | | | |
|---|---|---|---|
| 3,280,641 | 10/1966 | Ensley | 73/516 R |
| 3,597,043 | 8/1971 | Dreyer | 350/149 |
| 3,657,928 | 4/1972 | Melamed | 350/160 LC X |
| 3,694,053 | 9/1972 | Kahn | 350/150 |
| 3,798,454 | 3/1974 | Weiss | 73/517 R X |
| 3,800,594 | 4/1974 | Hutchings et al. | 73/517 R X |

*Primary Examiner*—Edward S. Bauer
*Attorney, Agent, or Firm*—L. Lee Humphries; Robert M. Sperry

[57] ABSTRACT

An accelerometer comprising a first glass plate mounted in a fixed position, a second glass plate mounted in spaced relation with said first plate and movable with respect to said first plate, an aligning agent coating the facing surfaces of said plates, a nematic liquid crystal mixture filling the space between said plates, means applying an electrical potential between the coated surfaces of said plates, and means for detecting optical characteristics within said liquid crystal mixture.

3 Claims, 3 Drawing Figures

LIQUID CRYSTAL ACCELEROMETER

BACKGROUND OF THE INVENTION

1. Field of Invention

This invention relates to accelerometers and is particularly directed to electro-optic cells employing liquid crystals for use as accelerometers.

2. Prior Art

Accelerometers are transducers which convert mechanical energy into another form of energy, normally electrical. Numerous uses have been found for such devices. In addition, many different types of devices have been proposed for use as accelerometers. On the other hand, there is a never-ending search for new types of accelerometers which may be lighter, more compact, more accurate or otherwise advantageous.

In recent years, materials have been discovered which are liquids, yet have optical properties similar to those of crystalline substances. Such materials are referred to as "liquid crystals" and numerous uses have been found for these materials in instrument readout devices, computers and the like.

In accordance with the present invention, the unique properties of liquid crystal materials have been utilized to form a unique accelerometer which is compact, light in weight, extremely sensitive and is capable of use in remote or inaccessible locations.

The advantages of the present invention are preferably attained by forming a sandwich of two glass plates with a layer of liquid crystal material therebetween, mounting one of said plates in a fixed position, mounting the other of said plates to be sensitive to acceleration, causing a beam of light to traverse said layer of liquid crystal material, and sensing said beam of light to detect changes in the optical properties of said liquid crystal material resulting from changes in the rate of acceleration of said other plate.

These and other objects and features of the present invention will be apparent from the following detailed description taken with reference to the accompanying drawing.

DETAILED DESCRIPTION OF INVENTION

Figure 1:
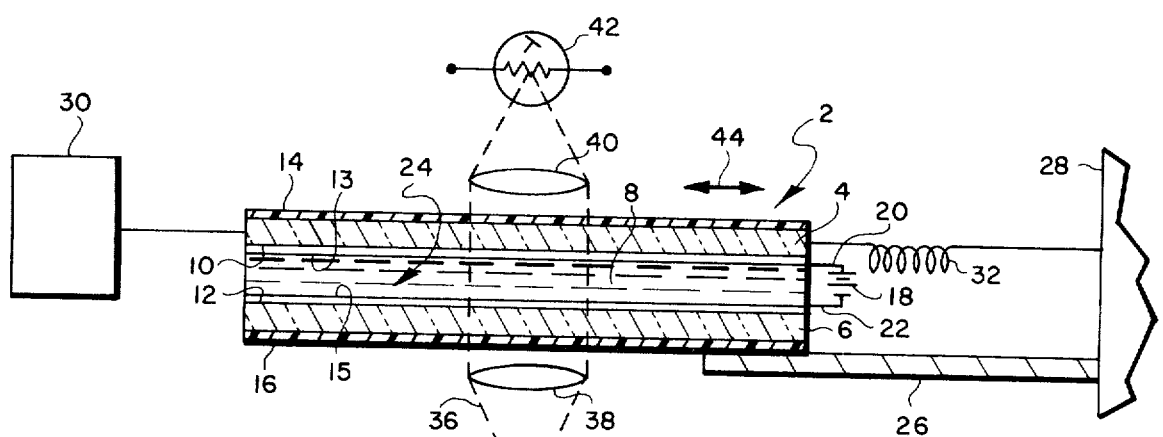
FIG. 1 is a diagrammatic representation of an accelerometer embodying the present invention.

In that form of the present invention chosen for purposes of illustration in FIG. 1, an accelerometer is shown, indicated generally at 2, comprising a pair of transparent plates 4 and 6, formed of glass or the like with a layer of liquid crystal material 8 interposed therebetween. The liquid crystal material 8 may be any suitable nematic liquid crystal material, such as a eutectic mixture of 45 parts by weight of 4-methoxybenzylidene-4'-n-butylaniline with 55 parts by weight of 4-ethoxybenzylidene-4'-n-butylaniline or a eutectic mixture of 15 parts by weight of 4-n-butoxybenzylidene-4'-cyanoaniline with 85 parts by weight of 4-methoxybenzylidene-4'-n-butyaniline. Any flexible means, such as cellophane tape, not shown, may be employed to retain the liquid crystal material 8 between the plates 4 and 6.

The facing surfaces 10 and 12 of the plates 4 and 6 are coated with coatings 13 and 15 of an electrically conductive lubricant or aligning agent, such as lecithin, to achieve homotropic alignment of the molecules of the liquid crystal material 8. In addition, the outer surfaces of the plates 4 and 6 are coated with a layer of light polarizing material, as seen at 14 and 16. A voltage source 18 is connected, as by conductors 20 and 22, to the lubricant coatings 13 and 15 to apply a suitable voltage, approximately 25 volts, across the liquid crystal material 8 to assure that the molecules of the liquid crystal material 8 are aligned perpendicular to the planes of the plates 4 and 6, as indicated at 24.

One of the plates, plate 4, for example, is fixedly mounted, as by cementing the plate 4 to a suitable flange 26 which projects from a suitable object 28. The second plate, plate 6, has one side thereof rigidly attached to a movable inertial mass member 30 and a suitable resilient means 32 is coupled between the opposite side of plate 4 and the object 28. Finally, a light source 34 provides a beam of light, indicated by dashed lines 36, which is collimated by a suitable optical system 38, traverses plates 4 and 6 and the liquid crystal material 8 is focused by a suitable lens 40 and is sensed by a suitable optical analyzer and photodetector 42.

In use, at rest or in equilibrium, the various parts of the accelerometer 2 are in the position shown in FIG. 1 and the output of the photodetector 42 is constant. However, if any acceleration should occur, there will be relative movement between the movable mass 30 and the object 28, causing plate 4 to shift with respect to plate 6, as indicated by arrow 44. This shifting of plate 4, with respect to plate 6, will cause a shearing action to occur within the liquid crystal material 8 which will disturb the molecular alignment and, hence, the optical properties of the liquid crystal material 8. This, in turn, will alter the light transmission of the liquid crystal material 8 and consequently, will vary the signal output of the photodetector 42. Since only very slight movement is required to cause shearing of the molecules of the liquid crystal material 8, the accelerometer 2 will be extremely sensitive. Moreover, the variation in the output of the photodetector 42 will be functionally related to the rate of acceleration over a significant range. Consequently, the accelerometer 2 will be extremely accurate, as well as sensitive. It will also be apparent that the accelerometer 2 may be very compact and light in weight. In addition, it will be obvious that the light beam 36 may be of any desired length. Thus, the light source 34 and photodetector 42 may be located at a considerable distance from the plates 4 and 6. Accordingly, the plates 4 and 6 may be located in a position which is remote or otherwise inaccessible.

Figure 2:
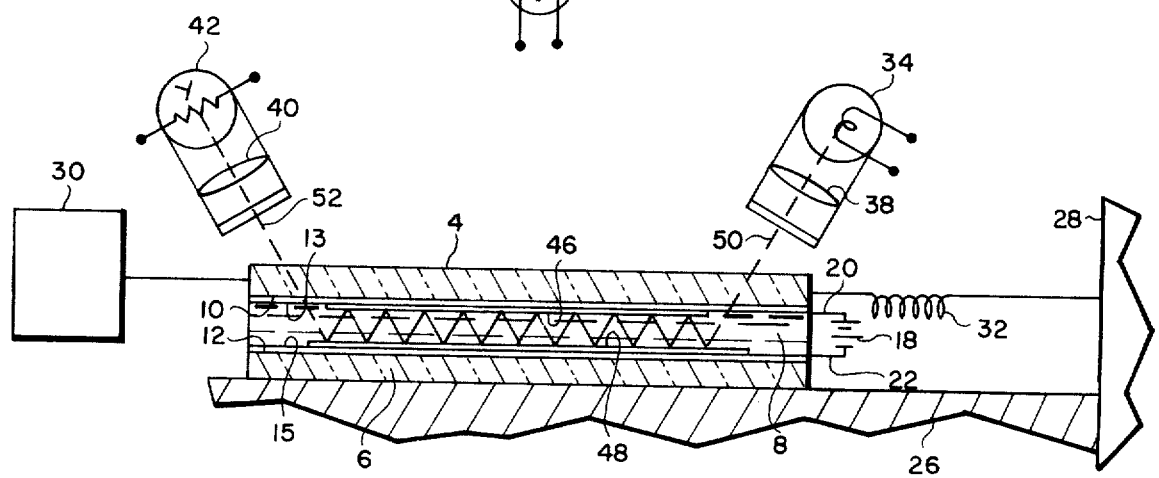
FIG. 2 is a diagrammatic representation of an alternative form of the accelerometer of FIG. 1.

FIG. 2 illustrates an alternative form of the accelerometer 2 of FIG. 1. In this form of the invention, the facing surfaces 10 and 12 of the plates 4 and 6 are covered with reflective coatings 46 and 48 and the light source 34 and photodetector 42 are located on a common side of the accelerometer 2. The light source 34 is positioned to direct a beam of polarized light, represented by dashed line 50, past one edge of the reflective coating 46 of plate 4 onto the reflective coating 48 of plate 6. The light beam 50 undergoes multiple reflection at the reflective coatings 46 and 48 until it passes beyond the opposite end of reflective coating 46 of plate 4, as seen at 52, and is detected after passage through an analyzer by photodetector 42.

Obviously, each time that the light beam 50 is reflected from reflective coating 44, it travels through the liquid crystal material 8 to the reflective coating 46 and vice versa. Thus, as with the device of FIG. 1, any movement of plate 4, with respect to plate 6, in the direction indicated by arrow 44, will cause shearing within the liquid crystal material 8 which will disturb the optical properties of the liquid crystal material 8 and, hence, will alter the passage of light beam 50. This will be sensed by photodetector 42.

Figure 3:
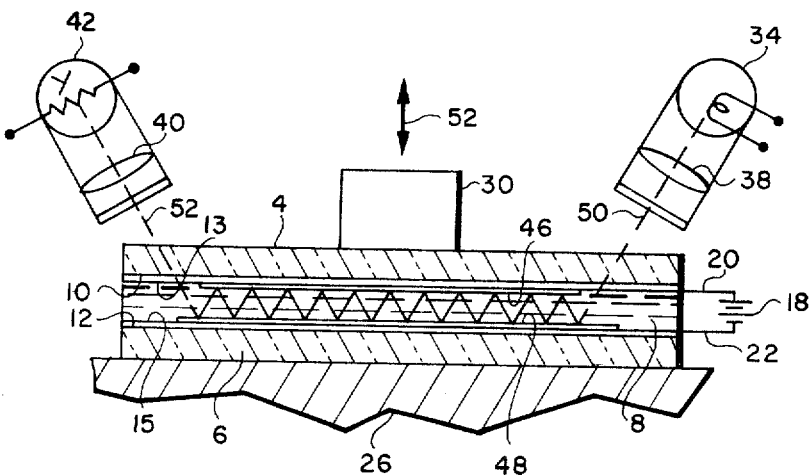
FIG. 3 is a diagrammatic representation of a further alternative form of the accelerometer of FIG. 1.

FIG. 3 illustrates a further alternative form of the present invention. This form of the invention is similar to that of FIG. 2. However, in this form of the invention, the mass 30 has been mounted directly on plate 4 and the resilient means 32 has been omitted.

With the apparatus of FIG. 3, vertical motion of plate 4 relative to plate 6, as indicated by arrow 52, will cause stretching or compression of the crystals within the liquid crystal material 8. This, in turn, will alter the optical properties of the liquid crystal material 8, causing changes in the light beam 50 which will be sensed by the photodetector 42.

Obviously, numerous other variations and modifications may be made without departing from the present invention such as utilizing a laser for the light source. Accordingly, it should be clearly understood that the forms of the present invention described above and shown in the accompanying drawing are illustrative only and are not intended to limit the scope of the present invention.

What is claimed is:

1. An accelerometer comprising;
   a first plate formed of electrically non-conductive material fixedly mounted on an article whose acceleration is to be sensed,
   a second plate formed of electrically non-conductive material mounted in spaced relation with said first plate and movable with respect to said first plate and resiliently connected to said article,
   an inertial mass fixedly connected to said second plate,
   an aligning agent coating the facing surfaces of said plates,
   a nematic liquid crystal mixture filling the space between said plates,
   means applying an electrical potential between the coated surfaces of said plates, and
   optical means for detecting changes in the optical characteristics within said liquid crystal mixture to provide an indication of the acceleration of said article.

2. The device of claim 1 wherein;
   said plates are transparent, and
   said optical means including light source means passing a light beam through said plates and said liquid crystal mixture and photodetector means positioned to sense said light beam.

3. The device of claim 1 wherein;
   one of said plates is transparent,
   optically reflective coating means applied to the facing surfaces of said plates, and
   said optical means includes light source means positioned to cause a light beam to undergo multiple reflections between the facing surfaces of said plates and photodetector means positioned to sense said light beam.

* * * * *